(12) United States Patent
Amburn

(10) Patent No.: US 12,599,241 B2
(45) Date of Patent: Apr. 14, 2026

(54) PORTABLE HEATING PAD ASSEMBLY

(71) Applicant: Kody Amburn, Dassel, MN (US)

(72) Inventor: Kody Amburn, Dassel, MN (US)

( * ) Notice: Subject to any disclaimer, the term of this patent is extended or adjusted under 35 U.S.C. 154(b) by 960 days.

(21) Appl. No.: 17/837,180

(22) Filed: Jun. 10, 2022

(65) Prior Publication Data

US 2023/0397734 A1     Dec. 14, 2023

(51) Int. Cl.
*H05B 3/02* (2006.01)
*A47C 7/74* (2006.01)
*B60N 2/56* (2006.01)
*B62B 9/20* (2006.01)

(52) U.S. Cl.
CPC ............ *A47C 7/748* (2013.01); *B60N 2/5678* (2013.01); *B62B 9/20* (2013.01); *H05B 3/02* (2013.01)

(58) Field of Classification Search
CPC ...... H05B 3/02; H05B 3/36; H05B 2203/014; H05B 2203/003; B62B 9/20; B60N 2/5678; A47C 7/748; A41D 13/0051
USPC ....... 219/202, 211, 212, 386, 387, 473, 527, 219/529, 544, 545, 549
See application file for complete search history.

(56) References Cited

U.S. PATENT DOCUMENTS

| | | | | | |
|---|---|---|---|---|---|
| 5,986,243 | A | * | 11/1999 | Campf ..................... | H05B 3/36 |
| | | | | | 219/211 |
| 2011/0248532 | A1 | | 10/2011 | Kim | |
| 2012/0061371 | A1 | * | 3/2012 | Broom ................. | A63C 11/222 |
| | | | | | 280/821 |

FOREIGN PATENT DOCUMENTS

| | | |
|---|---|---|
| DE | 2203678 | 8/1973 |

* cited by examiner

*Primary Examiner* — Phuong T Nguyen

(57) ABSTRACT

A portable heating pad assembly for on-demand heating of a seat of a vehicle or a stroller includes a housing, which defines an interior space. A battery, which is rechargeable, is positioned in the interior space. A power cord, which is operationally engaged to the battery, is attached to and extends from the housing. A plug of the power cord is engageable to a receptacle of a source of electrical current to charge the battery. A power cable, which is operationally engaged to the battery, is attached to and extends from the housing. A heating pad is operationally engaged to the power cable and can be selectively positioned on a seat of a vehicle and a seating surface of a stroller. The heating pad thus can warm a child seated in the seat of the vehicle or in the stroller.

10 Claims, 5 Drawing Sheets

PORTABLE HEATING PAD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to heating pads and more particularly pertains to a new heating pad for on-demand heating of a seat of a vehicle or a stroller. The present invention discloses a battery powered heating pad that can be used in a vehicle or a stroller to warm a child. The battery is rechargeable by connection to alternating current sources, direct current sources, and a solar panel.

(2) Description of Related Art Including Information Disclosed Under 37 CFR 1.97 and 1.98

The prior art relates to heating pads, which may comprise battery powered heating pads for seats of vehicles and strollers. What is lacking in the prior art is a battery powered heating pad for use with seats of vehicles and strollers wherein the battery is rechargeable by connection to alternating current sources, direct current sources, and a solar panel. Further lacking in the prior art is a heating pad having a bulb engaged to the battery for selective provision of light.

BRIEF SUMMARY OF THE INVENTION

An embodiment of the disclosure meets the needs presented above by generally comprising a housing, which defines an interior space. A battery, which is rechargeable, is positioned in the interior space. A power cord, which is operationally engaged to the battery, is attached to and extends from the housing. A plug of the power cord is configured to engage a receptacle of a source of electrical current to charge the battery. A power cable, which is operationally engaged to the battery, is attached to and extends from the housing. A heating pad is operationally engaged to the power cable and is configured to be selectively positioned on a seat of a vehicle and a seating surface of a stroller. The heating pad is configured to warm a child seated in the seat of the vehicle or in the stroller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
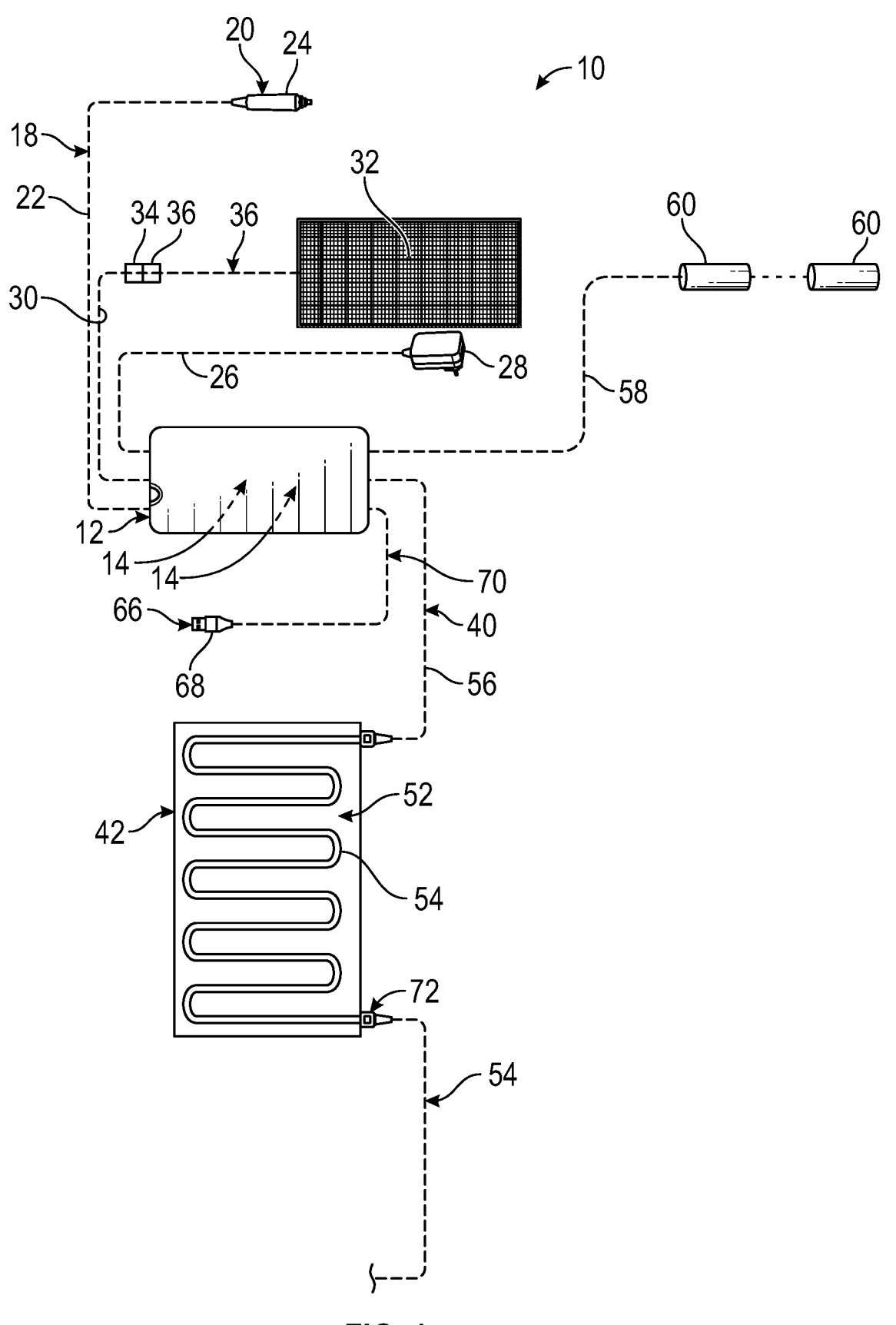
FIG. 1 is a schematic view of a portable heating pad assembly according to an embodiment of the disclosure.

With reference now to the drawings, and in particular to FIGS. 1 through 5 thereof, a new heating pad embodying the principles and concepts of an embodiment of the disclosure and generally designated by the reference numeral 10 will be described.

Figure 2:
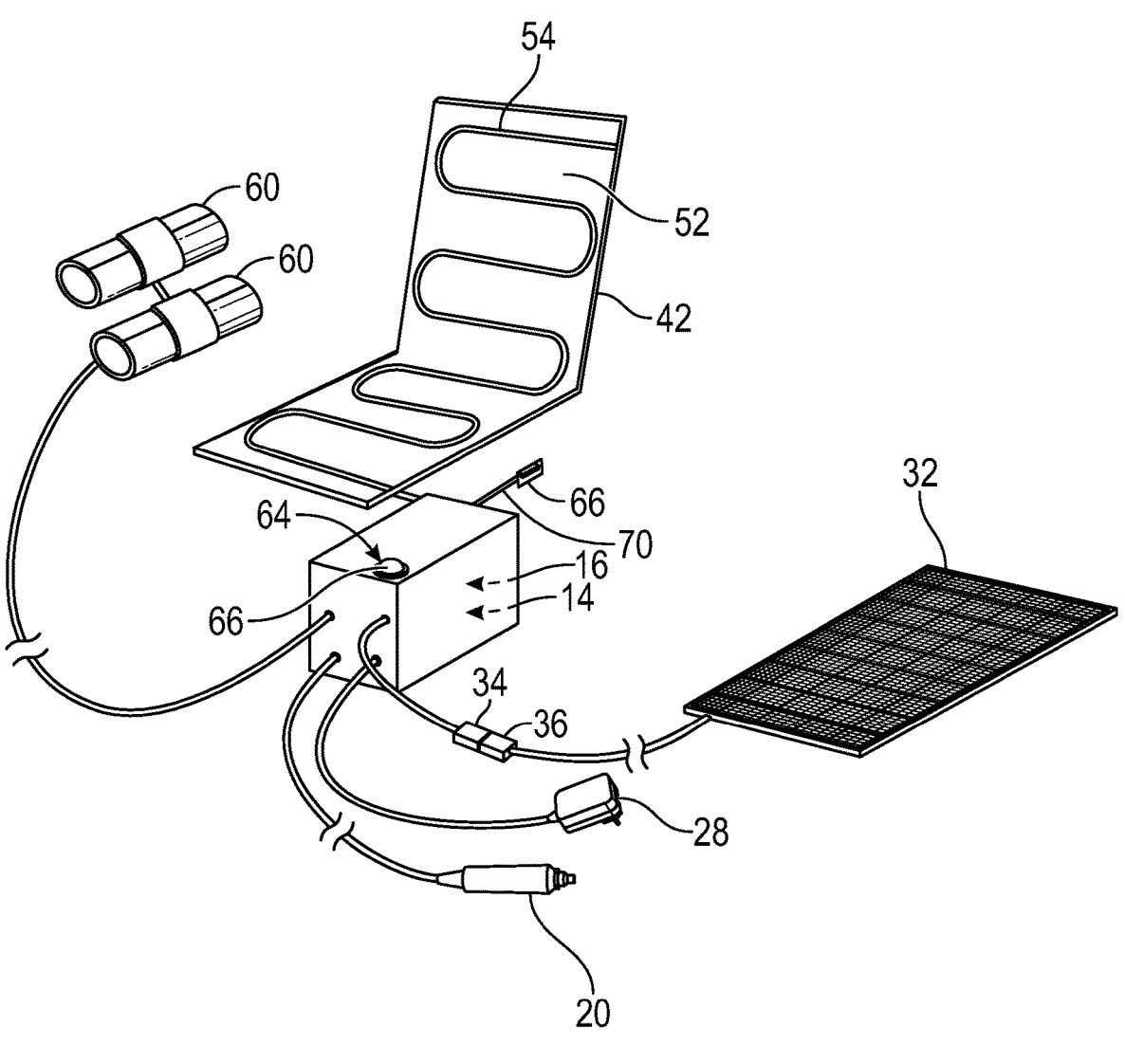
FIG. 2 is an isometric perspective view of an embodiment of the disclosure.
Figure 3:
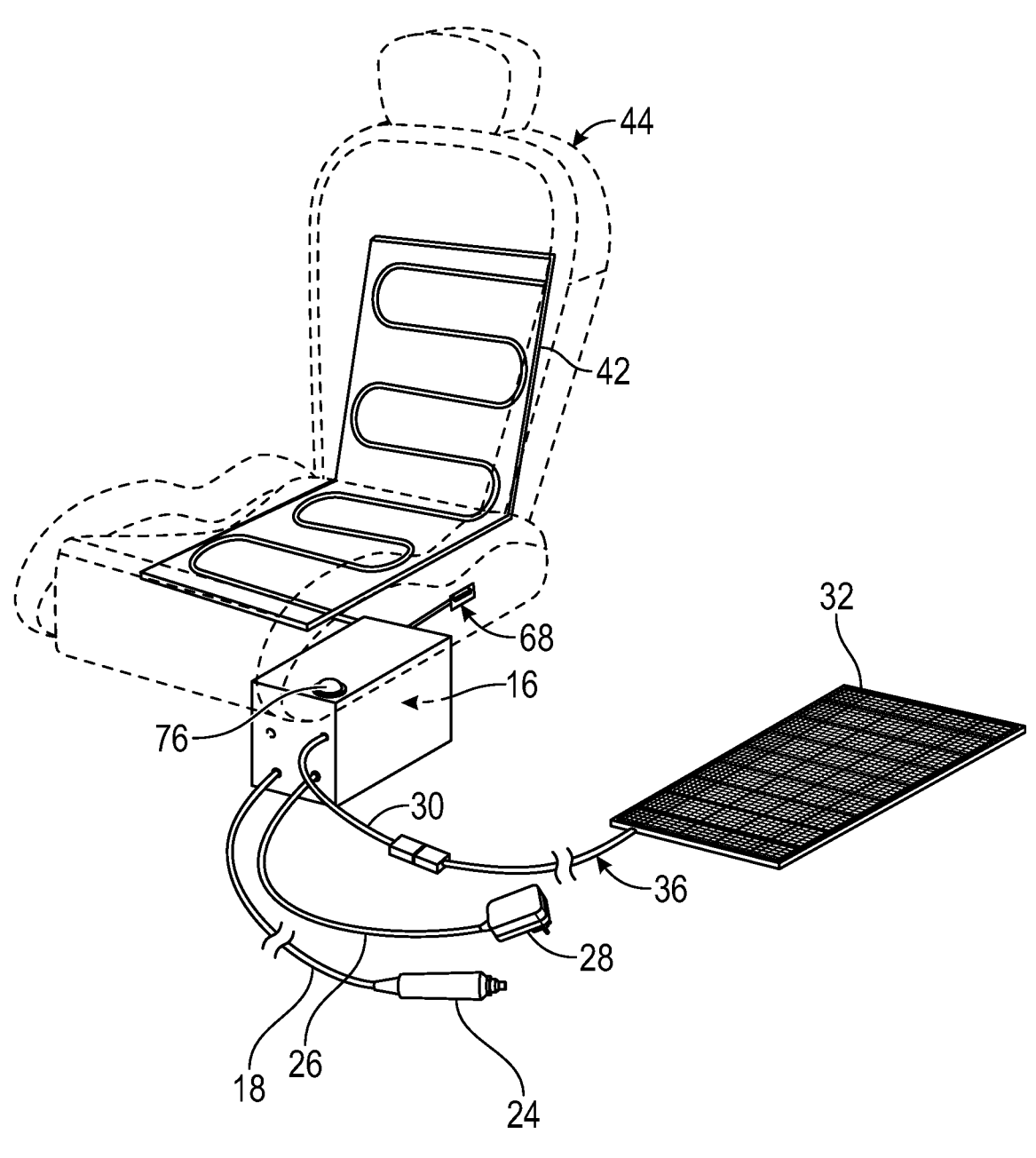
FIG. 3 is an in-use view of an embodiment of the disclosure.
Figure 4:
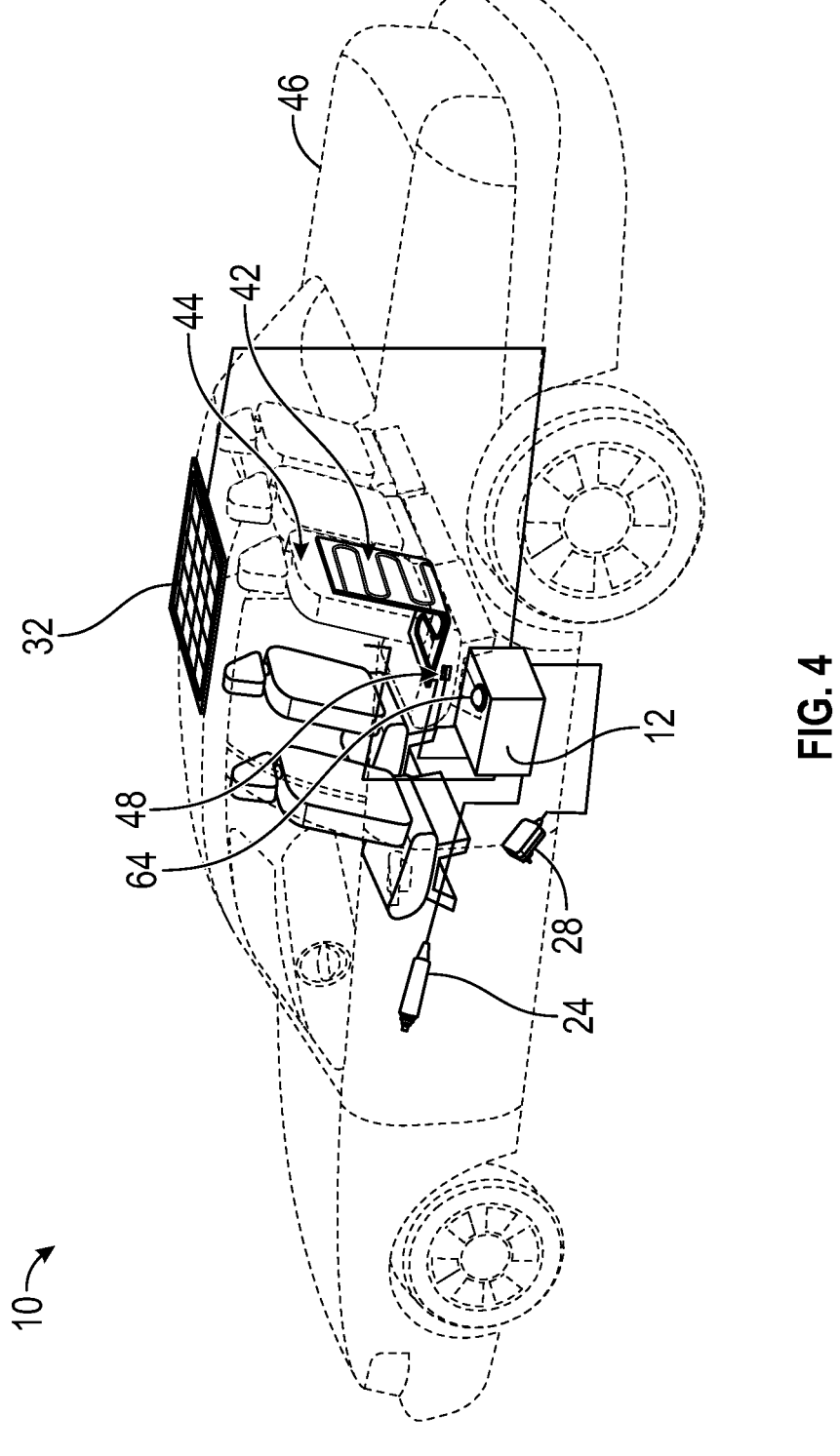
FIG. 4 is an in-use view of an embodiment of the disclosure.
Figure 5:
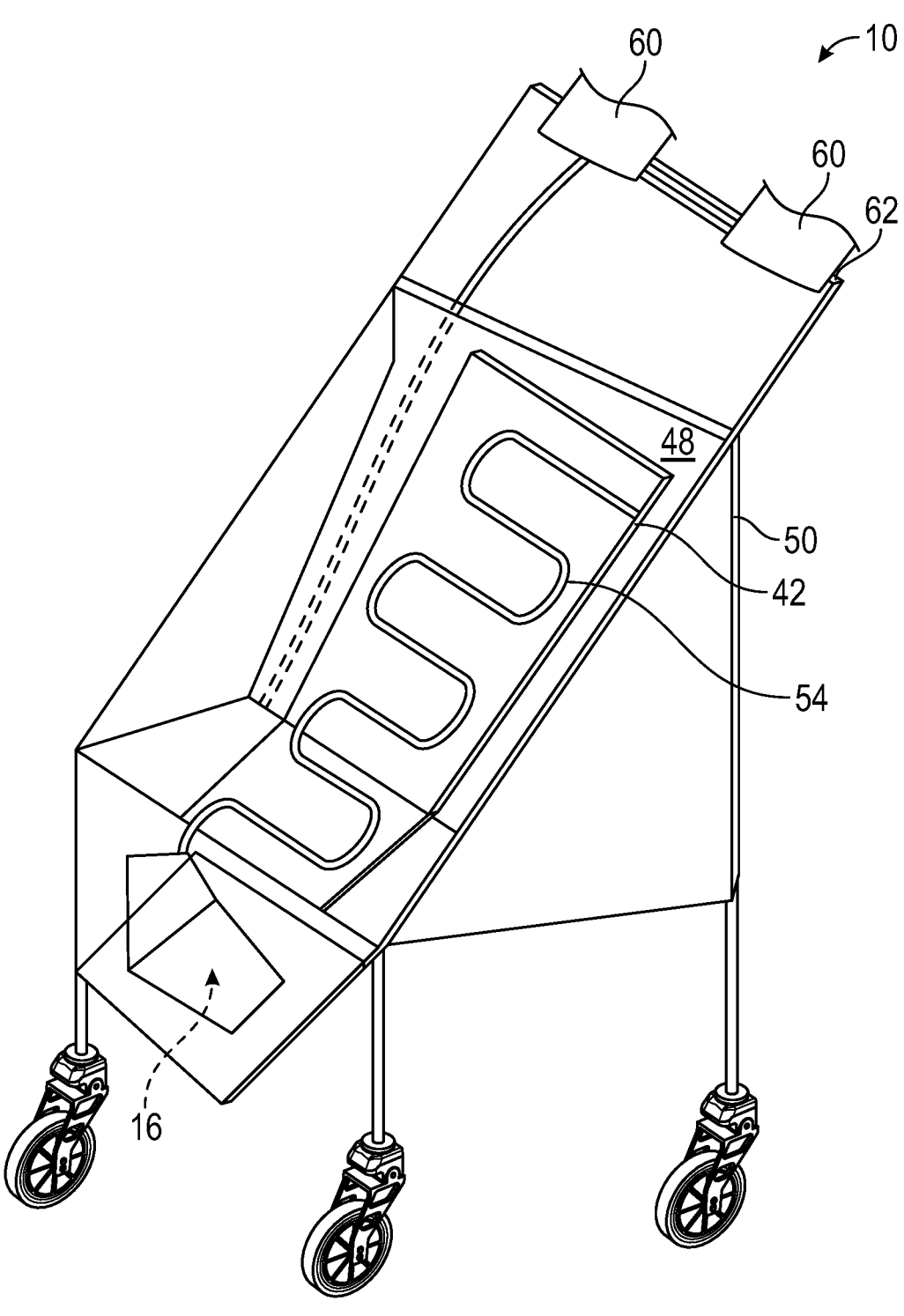
FIG. 5 is an in-use view of an embodiment of the disclosure.

As best illustrated in FIGS. 1 through 5, the portable heating pad assembly 10 generally comprises a housing 12, which defines an interior space 14. A battery 16, which is rechargeable, is positioned in the interior space 14. A power cord 18, which is operationally engaged to the battery 16, is attached to and extends from the housing 12. A plug 20 of the power cord 18 is configured to engage a receptacle of a source of electrical current to charge the battery 16. As shown in FIG. 2, the power cord 18 comprises a first cord 22 and the plug 20 comprises an automobile auxiliary power plug 24.

The portable heating pad assembly 10 also may comprise a second cord 26, which is attached to and which extends from the housing 12 and which is operationally engaged to the battery 16. An alternating current adapter plug 28 is attached to the second cord 26 distal from the housing 12. The alternating current adapter plug 28 is configured to be plugged into a socket (not shown) and to convert alternating current to direct current to charge the battery 16.

The portable heating pad assembly 10 also may comprise a third cord 30, which is attached to and which extends from the housing 12, and a solar panel 32. The third cord 30 is operationally engaged to the battery 16. A first connector 34 is attached to the third cord 30 distal from the housing 12.

A connecting cord 36 is attached to and extends from the solar panel 32. A second connector 38, which is complementary to the first connector 34, is attached to the connecting cord 36 distal from the solar panel 32. The second connector 38 is positioned to selectively connect to the first connector 34 to operationally engage the solar panel 32 to the battery 16 to charge the battery 16.

The present invention anticipates the first cord 22, the second cord 26, and the third cord 30 being reversibly attachable to the housing 12, and thus reversibly operationally engageable to the battery 16, by means well known to those skilled in the art of reversible battery connections, such as, but not limited to, barrel and socket connections, plug and socket connections, and the like.

A power cable 40, which is operationally engaged to the battery 16, is attached to and extends from the housing 12. A heating pad 42 is operationally engaged to the power cable 40 and is configured to be selectively positioned on a seat 44 of a vehicle 46 and a seating surface 48 of a stroller 50. The heating pad 42 comprises a cushion 52, which is substantially rectangular. A heating element 54 is embedded in the cushion 52. The heating pad 42 is configured to warm a child seated in the seat 44 of the vehicle 46 or the stroller 50. Seat 44 of a vehicle 46 in the context of this disclosure should be interpreted to mean a factory installed seat, a child car seat, a booster seat, and the like.

As shown in FIG. 2, the power cable 40 comprises a first cable 56. The portable heating pad assembly 10 also may comprise a second cable 58 and a pair of hand warmers 60. The second cable 58, which is attached to and which extends from the housing 12, is operationally engaged to the battery 16. The hand warmers 60 are operationally engaged to the second cable 58 and are configured to be selectively attached to a push bar 62 of the stroller 50. The hand warmers 60 thus are configured to warm hands of a user who is pushing the stroller 50. The present invention anticipates the hand warmers 60 being attachable to the push bar 62 by means of hook and loop fasteners, straps, and the like.

The present invention anticipates the first cable 56 and the second cable 58 being reversibly attachable to the housing 12, and thus reversibly operationally engageable to the battery 16, by means well known to those skilled in the art of reversible battery connections, such as, but not limited to, barrel and socket connections, plug and socket connections, and the like.

A bulb 64, which may comprise a light emitting diode 76, is attached to the housing 12 and is selectively operationally engageable to the battery 16 to illuminate an area proximate to the housing 12. The bulb 64, which is depressible, is configured to be depressed a first time to operationally engage the bulb 64 to the battery 16 and to be depressed a second time to disengage the bulb 64 from the battery 16.

A power port 66 is attached to the housing 12 and is operationally engaged to the battery 16. The power port 66 is configured for insertion of a power plug of an electronic device (not shown), such as a phone, tablet, laptop, or the like, to power the electronic device. As shown in FIG. 2, the power port 66 comprises a Universal Serial Bus port 68. An extender cable 70 is operationally engaged to and is positioned between the power port 66 and the housing 12, allowing the power port 66 to be positioned as needed.

The portable heating pad assembly 10 also comprises a jumper port 72, which is attached to the heating pad 42 and is configured to operationally engage a jumper cable 74 to operationally engage the heating pad 42 to another heating pad 42. The jumper port 72 and the jumper cable 74 allow the battery 16 to power multiple heating pads 42, which would be useful for double strollers or for heating two or more seats 44 in the vehicle 46.

In one example of use, the portable heating pad assembly 10 is positioned in a vehicle 46 with the heating pad 42 positioned on a seat 44 of the vehicle 46. The heating pad 42 thus can warm a child who is seated in the seat 44. Many vehicles 46 have rear seats 44 that are not heated and the portable heating pad assembly 10 is of particular use with such vehicles 46. In another example of use with a stroller 50, the pair of hand warmers 60 is attached to the push bar 62 of the stroller 50 and the heating pad 42 is positioned on the seating surface 48 of the stroller 50. The heating pad 42 warms a child who is seated in the stroller 50, while the hand warmers 60 warm hands of a user who is pushing the stroller 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable heating pad assembly comprising:
   a housing defining an interior space;
   a battery positioned in the interior space, the battery being rechargeable;
   a power cord attached to and extending from the housing, the power cord being operationally engaged to the battery, wherein a plug of the power cord is configured for engaging a receptacle of a source of electrical current for charging the battery;
   a power cable attached to and extending from the housing, the power cable being operationally engaged to the battery; and
   a heating pad operationally engaged to the power cable, the heating pad being configured for selectively positioning on a seat of a vehicle and a seating surface of a stroller, wherein the heating pad is configured for warming a child seated in the seat of the vehicle or in the stroller;
   wherein the power cord comprises a first cord;
   wherein the plug comprises an automobile auxiliary power plug;
   a second cord attached to and extending from the housing, the second cord being operationally engaged to the battery;
   an alternating current adapter plug attached to the second cord distal from the housing, wherein the alternating current adapter plug is configured for plugging into a socket and for converting alternating current to direct current for charging the battery;

a third cord attached to and extending from the housing, the third cord being operationally engaged to the battery;

a first connector attached to the third cord distal from the housing;

a solar panel;

a connecting cord attached to and extending from the solar panel; and a second connector attached to the connecting cord distal from the solar panel, the second connector being complementary to the first connector, such that the second connector is positioned for selectively connecting to the first connector for operationally engaging the solar panel to the battery for charging the battery.

2. The portable heating pad assembly of claim 1, further including:

the power cable comprising a first cable;

a second cable attached to and extending from the housing, the second cable being operationally engaged to the battery; and a pair of hand warmers operationally engaged to the second cable, the hand warmers being configured for selectively attaching to a push bar of a stroller, wherein the hand warmers are configured for warming hands of a user pushing the stroller.

3. The portable heating pad assembly of claim 1, wherein the heating pad comprises:

a cushion, the cushion being substantially rectangular; and a heating element embedded in the cushion.

4. The portable heating pad assembly of claim 1, further including a bulb attached to the housing and being selectively operationally engageable to the battery for illuminating an area proximate to the housing.

5. The portable heating pad assembly of claim 4, wherein the bulb is depressible, wherein the bulb is configured for depressing a first time for operationally engaging the bulb to the battery and for depressing a second time for disengaging the bulb from the battery.

6. The portable heating pad assembly of claim 4, wherein the bulb comprises a light emitting diode.

7. The portable heating pad assembly of claim 1, further including a power port attached to the housing and operationally engaged to the battery, wherein the power port is configured for insertion of a power plug of an electronic device for powering the electronic device.

8. The portable heating pad assembly of claim 7, further including an extender cable operationally engaged to and positioned between the power port and the housing.

9. The portable heating pad assembly of claim 1, further including a jumper port attached to the heating pad and being configured for operationally engaging a jumper cable for operationally engaging the heating pad to another heating pad.

10. A portable heating pad assembly comprising:

a housing defining an interior space;

a battery positioned in the interior space, the battery being rechargeable;

a power cord attached to and extending from the housing, the power cord being operationally engaged to the battery, wherein a plug of the power cord is configured for engaging a receptacle of a source of electrical current for charging the battery;

a power cable attached to and extending from the housing, the power cable being operationally engaged to the battery;

a heating pad operationally engaged to the power cable, the heating pad being configured for selectively positioning on a seat of a vehicle and a seating surface of a stroller, wherein the heating pad is configured for warming a child seated in the seat of the vehicle or in the stroller;

the power cord comprising a first cord, the plug comprising an automobile auxiliary power plug;

a second cord attached to and extending from the housing, the second cord being operationally engaged to the battery;

an alternating current adapter plug attached to the second cord distal from the housing, wherein the alternating current adapter plug is configured for plugging into a socket and for converting alternating current to direct current for charging the battery;

a third cord attached to and extending from the housing, the third cord being operationally engaged to the battery;

a first connector attached to the third cord distal from the housing;

a solar panel;

a connecting cord attached to and extending from the solar panel;

a second connector attached to the connecting cord distal from the solar panel, the second connector being complementary to the first connector, such that the second connector is positioned for selectively connecting to the first connector for operationally engaging the solar panel to the battery for charging the battery;

the power cable comprising a first cable;

a second cable attached to and extending from the housing, the second cable being operationally engaged to the battery;

a pair of hand warmers operationally engaged to the second cable, the hand warmers being configured for selectively attaching to a push bar of a stroller, wherein the hand warmers are configured for warming hands of a user pushing the stroller;

the heating pad comprising:

a cushion, the cushion being rectangular, and a heating element embedded in the cushion;

a bulb attached to the housing and being selectively operationally engageable to the battery for illuminating an area proximate to the housing, the bulb being depressible, wherein the bulb is configured for depressing a first time for operationally engaging the bulb to the battery and for depressing a second time for disengaging the bulb from the battery, the bulb comprising a light emitting diode;

a power port attached to the housing and operationally engaged to the battery, wherein the power port is configured for insertion of a power plug of an electronic device for powering the electronic device;

an extender cable operationally engaged to and positioned between the power port and the housing; and a jumper port attached to the heating pad and being configured for operationally engaging a jumper cable for operationally engaging the heating pad to another heating pad.

* * * * *